G. W. DOVER.
MEANS FOR LOCKING PULLEYS OR THE LIKE TO SHAFTS.
APPLICATION FILED AUG. 19, 1918.

1,323,172.

Patented Nov. 25, 1919.

INVENTOR
George William Dover,
by Chas. H. Luther
ATTORNEY

UNITED STATES PATENT OFFICE.

GEORGE WILLIAM DOVER, OF CRANSTON, RHODE ISLAND, ASSIGNOR TO GEORGE W. DOVER, INCORPORATED, OF PROVIDENCE, RHODE ISLAND, A CORPORATION OF RHODE ISLAND.

MEANS FOR LOCKING PULLEYS OR THE LIKE TO SHAFTS.

1,323,172.            Specification of Letters Patent.      Patented Nov. 25, 1919.

Application filed August 19, 1918. Serial No. 250,507.

*To all whom it may concern:*

Be it known that I, GEORGE WILLIAM DOVER, a citizen of the United States, residing at Cranston, in the county of Providence and State of Rhode Island, have invented a new and useful Improvement in Means for Locking Pulleys or the like to Shafts, of which the following is a specification.

In the usual preferred method of securing pulleys or the like to shafts, the fastening member, heretofore of one piece, is set into a seat in the shaft and the pulley secured by driving the pulley over the shaft and fastening member, thereby securing the pulley to the shaft and locking the fastening member to the pulley and shaft. The fastening member being thus forced into its seat or groove in the shaft, is extremely hard to remove from the shaft and is usually destroyed in so doing. As these one-piece fastening members increase in size they also increase in thickness, which means that beyond a certain size they cannot easily and economically be struck from sheet metal.

The object of my invention is to improve the construction of a locking member for securing or locking pulleys or the like to shaftings, whereby the locking member is adapted to fit different widths of seats or grooves in shafting and pulleys, and may be easily and quickly removed from the shafting when required.

My invention consists in the peculiar and novel construction of such a locking member, said locking member being constructed of a plurality of parts of sheet metal, each part having identical structure including a coinciding indentation or notch in each end, as will be more fully set forth hereinafter and claimed.

Figure 1:
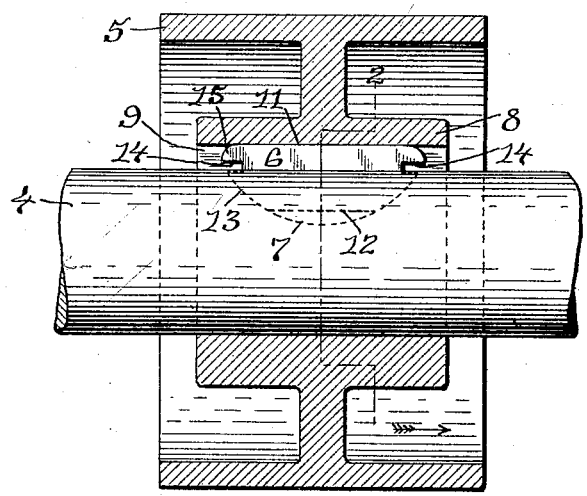
Figure 2:
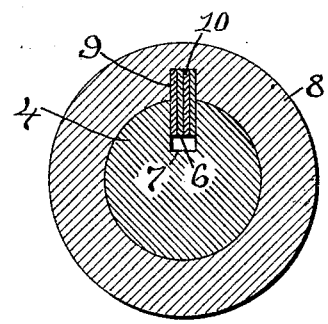
Figure 3:
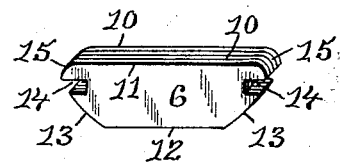

Figure 1 is a vertical sectional view through a pulley on a shaft shown in full lines and showing the pulley secured to the shaft by my improved locking means, Fig. 2 is a transverse sectional view taken on line 2—2 of Fig. 1, through the hub of the pulley, shaft and locking means, and Fig. 3 is a perspective view of my improved locking means for securing or locking pulleys or the like to shafts.

In the drawing 4 indicates a shaft, 5 a pulley and 6 my improved locking means. The shaft 5 has the usual seat or curved slot 7 for the locking means 6. The pulley 5 has the hub 8 in which is the usual straight groove 9 for the locking means 6, which consists of a plurality of thin members 10, 10 of a uniform thickness and struck from sheet steel. Each member 10 is constructed to have a straight top edge 11, fitting the groove 9 in the pulley hub 8, a straight bottom edge 12, curved ends 13, 13 shaped to fit in the curved slot 7 in the shaft 4, a notch 14 extending into each curved end 13 and rounded corners 15, 15 as shown in Fig. 3.

By making the locking means of a plurality of thin members, of uniform thickness, they can be easily, quickly and cheaply struck from sheet steel and it is only necessary to use the required number of members to fit any standard slot or groove, the notches 14, 14 being formed in the curved ends and extending slightly above the shaft allows the easy removal of the locking means from the shaft, by inserting a tool into a notch and prying the locking means out of the shaft. The notches 14, 14 are shown possibly larger than necessary, to more clearly show the construction. Under certain conditions it is easier to remove one of the members of the locking means, when the others can be more easily removed or will fall out by gravity.

Having thus described my invention I claim as new:

1. A locking means for the purpose described, said locking means consisting of a thin sheet metal longitudinal member of a predetermined size and thickness and having a straight top edge, a straight bottom edge, curved ends, a notch or opening extending into each curved end and rounded corners, as described.

2. A locking means for the purpose described consisting of a key formed of thin sheet metal constructed to have a straight top edge 11, a straight bottom edge 12, curved ends 13, 13, a notch 14 extending into each curved end and rounded corners 15, 15, as described.

In testimony whereof, I have signed my name to this specification.

GEORGE WILLIAM DOVER.